United States Patent
Kwok et al.

(10) Patent No.: US 8,709,916 B2
(45) Date of Patent: Apr. 29, 2014

(54) LASER PROCESSING METHOD AND APPARATUS

(75) Inventors: Chi Hang Kwok, Hong Kong (HK); Chi Wah Cheng, Hong Kong (HK); Lap Kei Chow, Hong Kong (HK)

(73) Assignee: ASM Technology Singapore Pte Ltd, Singapore (SG)

( * ) Notice: Subject to any disclaimer, the term of this patent is extended or adjusted under 35 U.S.C. 154(b) by 102 days.

(21) Appl. No.: 13/541,865

(22) Filed: Jul. 5, 2012

(65) Prior Publication Data

US 2014/0011336 A1     Jan. 9, 2014

(51) Int. Cl.
*H01L 21/304* (2006.01)
*H01L 21/268* (2006.01)

(52) U.S. Cl.
USPC .......... 438/463; 438/795; 257/E21.238; 257/E21.348

(58) Field of Classification Search
USPC .......... 438/463, 795; 257/E21.238, E21.348
See application file for complete search history.

(56) References Cited

U.S. PATENT DOCUMENTS

2004/0002199 A1 *   1/2004   Fukuyo et al. ............ 438/463

* cited by examiner

*Primary Examiner* — Mary Wilczewski
*Assistant Examiner* — Toniae Thomas
(74) *Attorney, Agent, or Firm* — Ostrolenk Faber LLP (57) ABSTRACT

A laser processing method is disclosed, comprising the steps of: directing a laser beam to a workpiece; and effecting a relative motion between the laser beam and the workpiece. In particular, the step of directing the laser beam to the workpiece comprises focusing the laser beam within the workpiece until an internal damage forms within the workpiece and a crack propagates from the internal damage to at least one surface of the workpiece to form a surface crack on the workpiece. Further, the step of effecting the relative motion between the laser beam and the workpiece is such that the surface crack on the workpiece propagates along a line of separation on the workpiece. A laser processing apparatus is also disclosed.

3 Claims, 7 Drawing Sheets

LASER PROCESSING METHOD AND APPARATUS

FIELD OF THE INVENTION

The present invention relates to a laser processing method and apparatus, which are particularly but not exclusively for singulating a semiconductor wafer using laser.

BACKGROUND OF THE INVENTION

Multiple semiconductor devices are fabricated in a matrix on a semiconductor wafer, which is typically made of material such as sapphire, silicon, gallium and/or their compounds. The semiconductor wafer is then cut by a laser to divide, or assist in dividing, the semiconductor devices into separate pieces.

Conventional laser singulation may include any of the following processes: i) laser scribing, in which linear grooves (or scribe lines) are formed on the semiconductor wafer surface to facilitate breakage along the grooves; or ii) laser cutting, in which the semiconductor wafer is cut through from its top surface to its bottom surface.

Specifically, laser singulation is contingent on delivering irradiance (i.e. fluence or energy) to the semiconductor wafer that exceeds its material ablation threshold. By focusing a laser beam using an objective lens, a laser output width of the Gaussian laser beam can be made small in the order of 1 to 20 μm. Such dimensions of the laser beam ensure that its irradiance exceeds the material ablation threshold of the semiconductor wafer for laser singulation.

Figure 1:
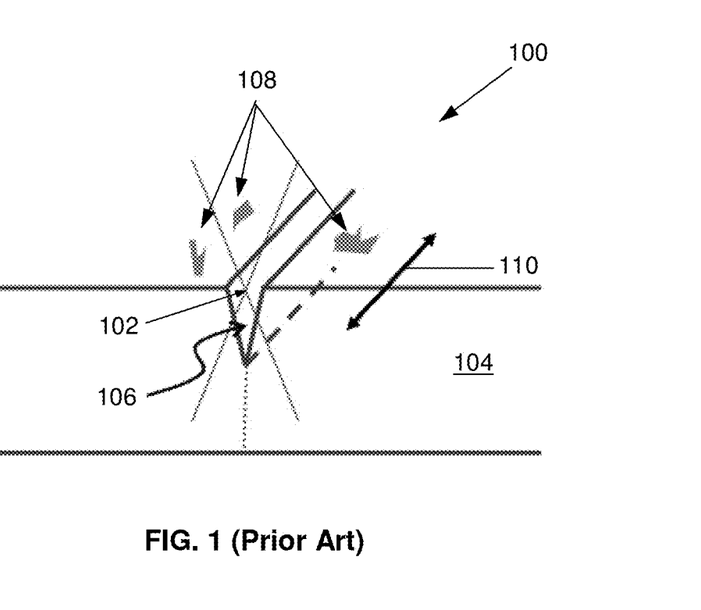
FIG. 1 shows a conventional surface scribing process.

FIG. 1 shows a conventional laser scribing process 100, in which a laser beam 102 is focused at a point on a surface of a semiconductor wafer 104 having semiconductor devices (not shown), before a relative motion between the laser beam 102 and the semiconductor wafer 104 is effected along a scribing direction 110 to form a scribe line 106 on the surface of the semiconductor wafer 104. However, when the laser beam 102 is focused on the surface of the semiconductor wafer 104 with the delivered irradiance at or above its material ablation threshold, debris 108 will be removed from the semiconductor wafer 104 and may redeposit back onto the surface of the semiconductor wafer 104. This may contaminate the semiconductor devices on the semiconductor wafer 104. Thus, the conventional laser singulation process has the problem of surface contamination of the semiconductor wafer 104.

One way to avoid the debris 108 from contaminating the semiconductor devices on the semiconductor wafer 104 is by performing surface coating and washing before and after laser processing. Unfortunately, the surface coating process has its own limitations. For instance, the surface and side-wall recast molten layer may affect the appearance and/or the performance of the semiconductor device after singulation. Other post-processing approaches, such as side-wall etching, have been proposed to mitigate this problem. However, extra pre- and post-processing of the surface-scribed wafer would ultimately limit the overall production yield and increase the running cost.

Thus, it is an object of this invention to at least seek to ameliorate the problems among conventional laser singulation processes.

SUMMARY OF THE INVENTION

A first aspect of the invention is a laser processing method comprising the steps of: directing a laser beam to a workpiece; and effecting a relative motion between the laser beam and the workpiece. In particular, the step of directing the laser beam to the workpiece comprises focusing the laser beam within the workpiece until an internal damage forms within the workpiece and a crack propagates from the internal damage to at least one surface of the workpiece to form a surface crack on the workpiece. Further, the step of effecting the relative motion between the laser beam and the workpiece is such that the surface crack on the workpiece propagates along a line of separation on the workpiece.

A second aspect of the invention is a laser processing apparatus comprising: a supporting device for holding a workpiece; a laser-emitting device for directing a laser beam to the workpiece; and a positioning device operative to effect a relative motion between the laser-emitting device and the supporting device. In particular, the laser-emitting device is configured to focus the emitted laser beam within the workpiece during operation until an internal damage forms within the workpiece and a crack propagates from the internal damage to at least one surface of the workpiece to form a surface crack on the workpiece. The positioning device is also configured to effect the relative motion between the laser-emitting device and the supporting device such that the surface crack on the workpiece propagates along a line of separation on the workpiece.

Some preferred but optional steps/features of the invention have been defined in the dependent claims.

BRIEF DESCRIPTION OF THE DRAWINGS

Preferred embodiments of the invention will now be described, by way of example only, with reference to the accompanying drawings, of which.

DETAILED DESCRIPTION OF THE PREFERRED EMBODIMENTS

Figure 2:
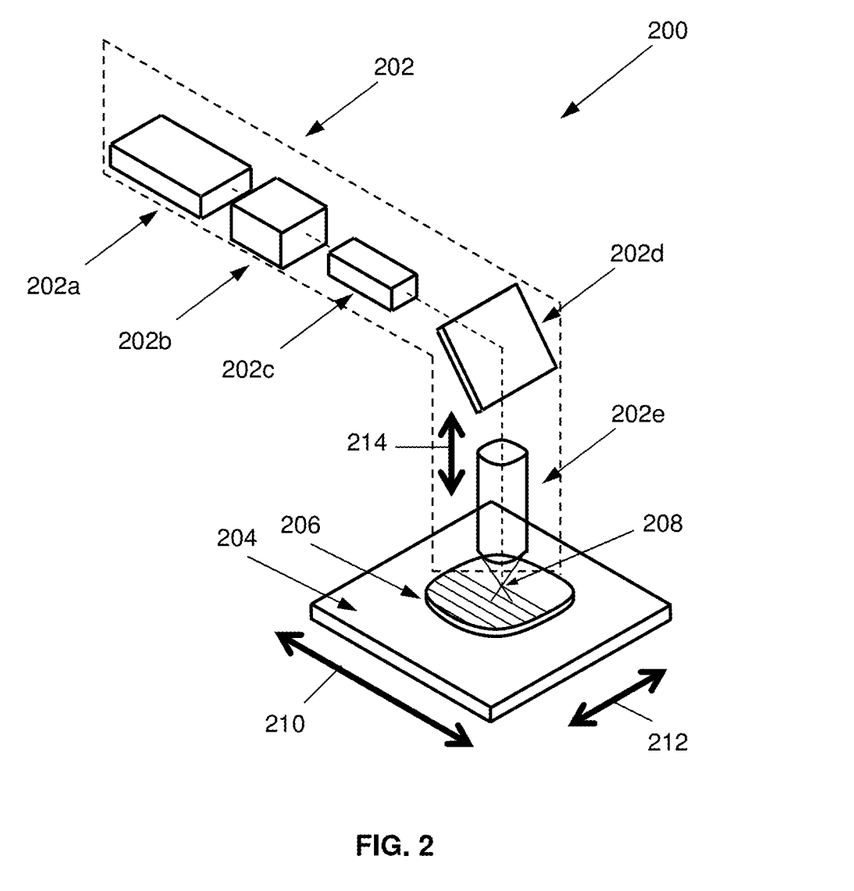
FIG. 2 shows a laser processing apparatus according to a preferred embodiment.

FIG. 2 is an isometric view of the laser processing apparatus 200 according to the preferred embodiment. The laser processing apparatus 200 comprises: i) a laser-emitting device 202; and ii) an XY-chuck table 204 for supporting and moving a semiconductor wafer 206. In particular, the laser-emitting device 202 is operative to direct a laser beam 208 to the semiconductor wafer 200. The XY-chuck table 204 is also operative to move the semiconductor wafer 206 relative to the laser-emitting device 202 with respect to a scribing axis 210 and also with respect to an indexing axis 212 that is perpendicular to the scribing axis 210.

Specifically, the laser-emitting device 202 comprises: i) a laser 202a for generating the laser beam 208; ii) an optical attenuator 202b for optically attenuating the laser beam 208; iii) a beam expander 202c for magnifying the laser beam 208; iv) a mirror 202d for reflecting the laser beam 208 towards the semiconductor wafer 206; and v) an objective lens 202e for focusing the laser beam 208 within the semiconductor wafer 206 along a focusing axis 214.

Figure 3:
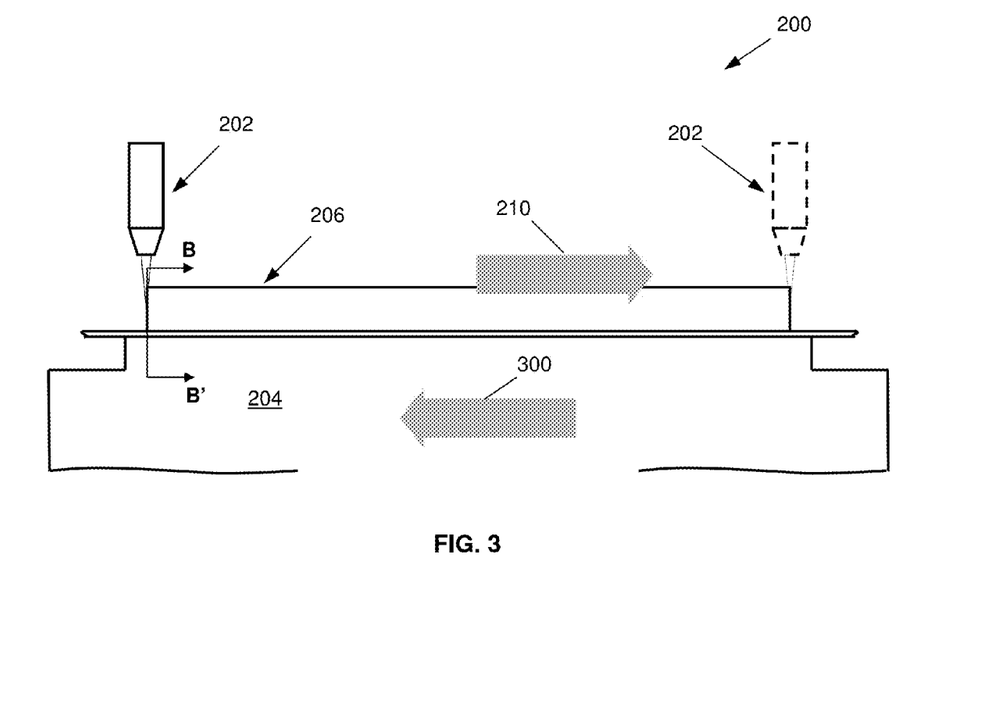
FIG. 3 shows an operation of the laser processing apparatus of FIG. 2.

FIG. 3 is a side view of the laser processing apparatus 200 showing a singulation operation of the laser processing apparatus 200. At the start of the operation, the laser-emitting device 202 is originally positioned with respect to the left side of the semiconductor wafer 206. As the XY-chuck table 204 move leftwards relative to the laser-emitting device 202 and in a direction parallel to the scribing axis 210—shown by arrow 300—the laser-emitting device 202 is consequently repositioned (even though the laser-emitting device 202 does not move) with respect to the right side of the semiconductor wafer 206, as shown by the dotted lines of the laser-emitting device 202 in FIG. 3. This also means that the movement of the XY-chuck table 204 effects a relative motion of the laser-emitting device 202 in a direction parallel to the scribing axis 210.

The singulation operation of the laser processing apparatus 200 will now be explained with reference to FIGS. 4a-4h showing cross-sectional views of the semiconductor wafer 206 as viewed along line B-B'.

Figure 4A:
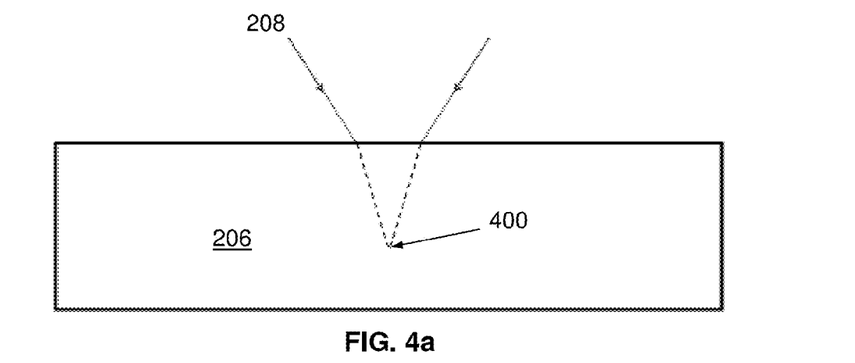
FIGS. 4a-4h show a singulation process of a semiconductor wafer using the laser processing apparatus of FIG. 2.
Figure 4B:
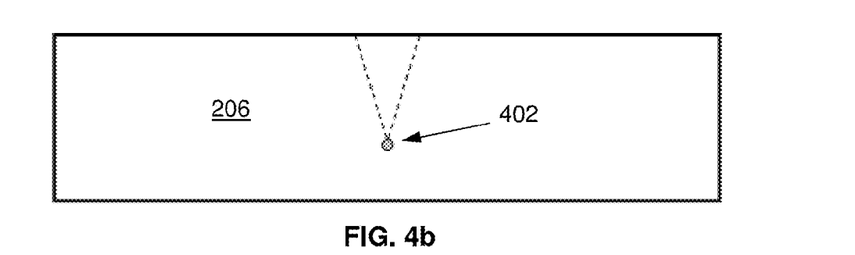
Figure 4C:
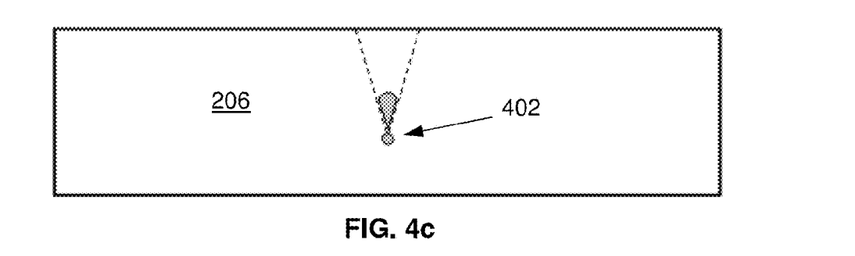
Figure 4D:
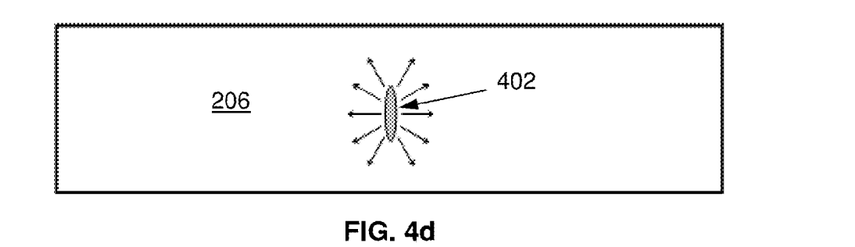
Figure 4E:
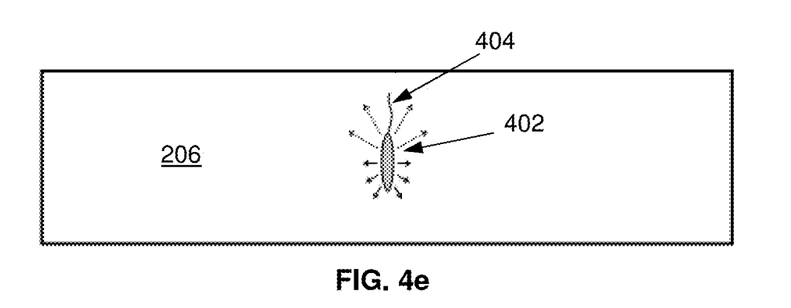
Figure 4F:
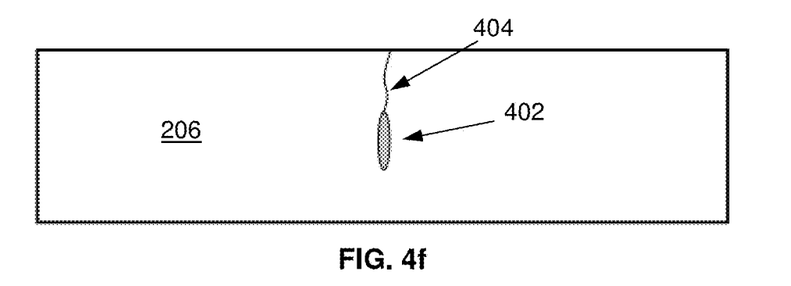

First, the laser beam 208 is focused at a focal point 400 inside the semiconductor wafer 206, as shown in FIG. 4a. The step of focusing the laser beam 208 at the focal point 400 inside the semiconductor wafer 206 continues until an internal damage 402 forms and grows around the focal point 400 inside the semiconductor wafer 206, as shown in FIGS. 4b-4d. By further continuing focus of the laser beam 208 within the semiconductor wafer 206, a crack 404 propagates from the internal damage 402 to a surface of the semiconductor wafer 206 to form a surface crack on the semiconductor wafer 206, as shown in FIGS. 4e-4f. As the XY-chuck table moves in the direction parallel to the scribing axis 210 relative to the laser-emitting device 202, the semiconductor wafer 206 would consequently be semi-scribed along a desired line of separation.

Figure 4G:
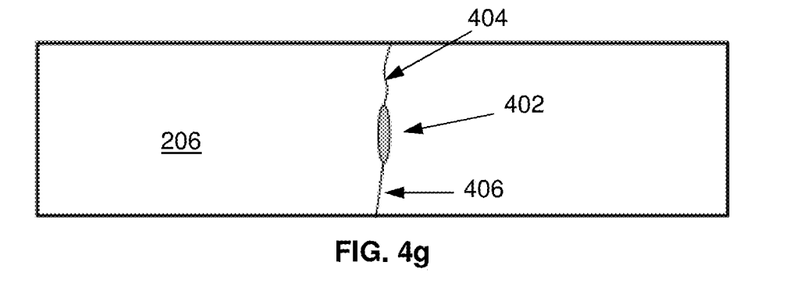
Figure 4H:
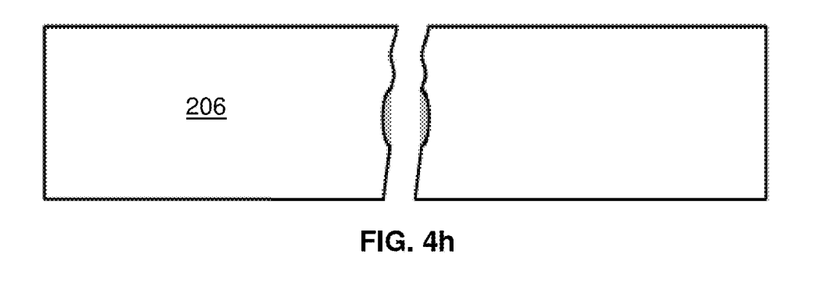

Optionally, continuous focus of the laser beam 208 within the semiconductor 206 may result in another crack 406 propagating from the internal damage 402 to the opposite surface of the semiconductor wafer 206 to form another surface crack on the semiconductor wafer 206, as shown in FIG. 4g. As the XY-chuck table 204 moves in the direction parallel to the scribing axis 210 relative to the laser-emitting device 202, the semiconductor wafer 206 would consequently be split into separate pieces along a desired line of separation, as shown in FIG. 4h. Such a process is particularly suitable if complete dicing of the semiconductor wafer 206 is desired, instead of semi-scribing of the semiconductor wafer 206.

The present inventors have found that formation of the crack(s) 404, 406 depends on factors such as the energy density of the laser beam 208 and the focus level of the laser beam 208 with respect to the surface of semiconductor wafer 206. In particular, the energy density of the laser beam 208 depends on parameters such as the laser wavelength and the motion of the XY-chuck table 204, whereas the focus level of the laser beam 208 depends on the parameters of the optics (e.g. the numerical aperture of the objective lens 202e.)

Specifically, the energy density of the laser beam 208 is defined as follows:

Energy density (uJ/um)=[Pulse energy (uJ/pulse)× Pulse repetition rate (KHz, Kpulse/s)]/Scribing speed (mm/s)

Accordingly, the volumetric energy (uJ/um³) of the laser beam 208 that is delivered at the focal point 400 inside the semiconductor wafer 206 is defined as follows:

$$\int_{-\frac{T}{2}}^{\frac{T}{2}} \int_{-Z_R}^{Z_R} \int_0^\infty \frac{P(t)}{\Pi w(z)} \exp\left(-\frac{r^2}{w(z)^2}\right) \exp\left(-\frac{2r^2}{w(z)^2}\right) dr\, dz\, dt$$

(where r and z are respectively the radius (um) and longitudinal height (um) along the laser beam path; P(t) is the time-dependent laser power profile of the laser pulse in a period of T, or a laser pulse repetition rate of 1/T; and $$w(z) = w_0 \sqrt{1 + \left(\frac{z}{z_R}\right)^2}$$

with the Rayleigh length, $$z_R = \frac{\Pi w_0^2}{\lambda},$$

which determines the length over which the laser beam can propagate without diverging significantly. The position z=0 in the equation above corresponds to the beam waist $w_0$ or focus where the laser beam radius is at its minimum.)

Based on the relevant factors for forming the crack(s) 404, 406, the laser processing apparatus 200 should preferably be configured such that the laser-emitting device 202 emits the laser beam 208 with a pulse energy density of between 0.3 and 0.8 uJ/um, with the emitted laser beam 208 being focused within the semiconductor wafer 206 at a distance of between 10 and 25 um from the surface of the semiconductor wafer 206. Preferably also, the volumetric energy of the laser beam 208 is between 35-140 KJ/m³. Alternatively, the laser processing apparatus 200 may be configured such that the laser-emitting device 202 emits the laser beam with a pulse energy density of at least 0.5 uJ/um, with the emitted laser beam 208 being focused within the semiconductor wafer 206 at a distance of between 25 and 40 um from the surface of the semiconductor wafer 206.

Figure 5A:
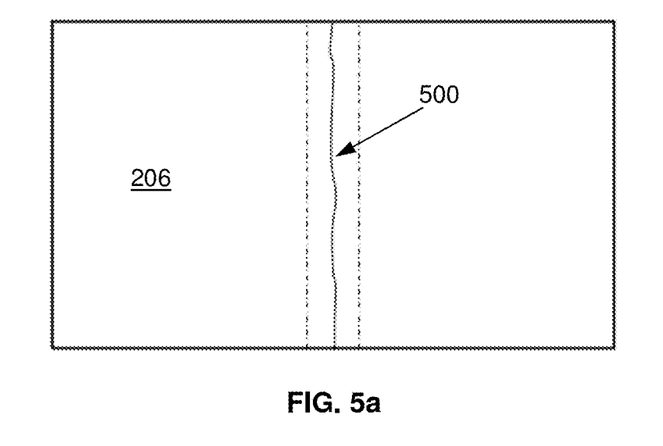
FIG. 5a and FIG. 5b are respective plan and isometric views of the semiconductor wafer after the singulation process using the laser processing apparatus of FIG. 2.
Figure 5B:
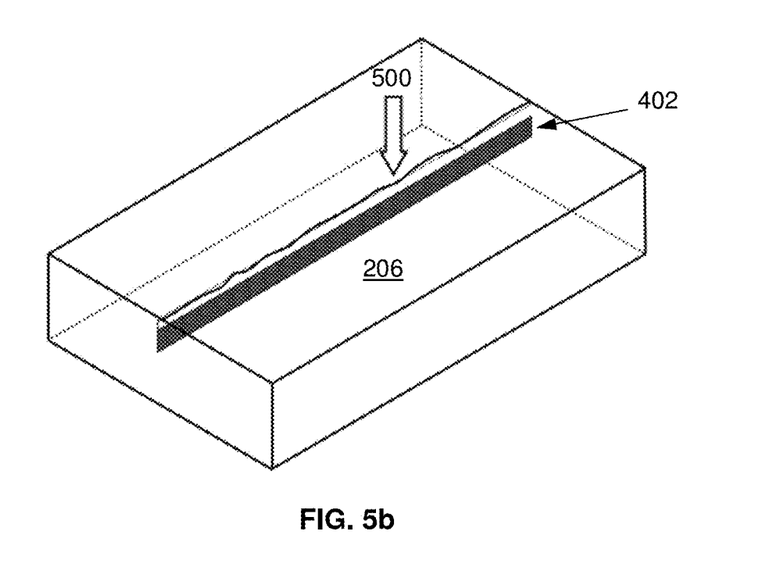

FIG. 5a and FIG. 5b show respective plan and isometric views of the semiconductor wafer 206 after the laser processing apparatus 200 has completed a singulation operation. It can be seen that a surface crack 500 is formed on the semiconductor wafer 206, which corresponds to a desired line of separation of the semiconductor wafer 206. In particular, the surface crack 500 is formed by the propagation of the crack 404 along the line of separation as the XY-chuck table 204 moves in the direction parallel to the scribing axis 210. It should be appreciated that the surface crack 500 is not necessarily a continuous line and may comprise a plurality of broken surface cracks instead. It should also be appreciated that the surface crack 500 is not necessarily a straight line and may have a deviation of a few microns (e.g. 1-2 microns).

Figure 6A:
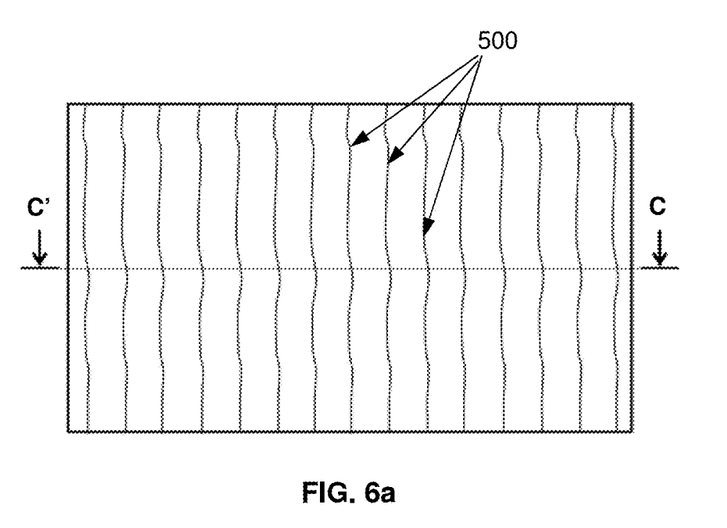
FIG. 6a and FIG. 6b are respective plan and cross-sectional views of the semiconductor wafer after multiple singulation processes using the laser processing apparatus of FIG. 2.
Figure 6B:
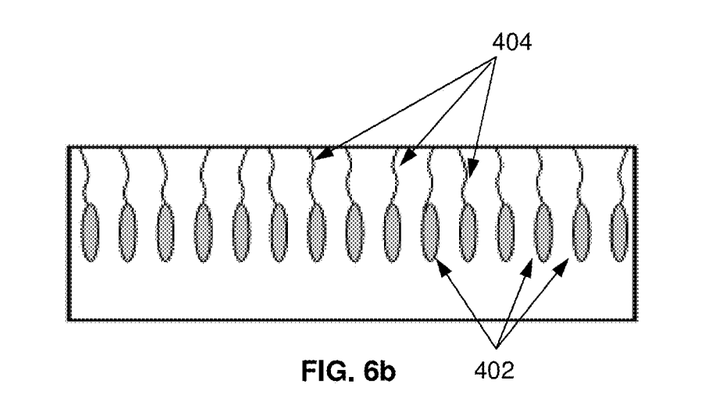

FIG. 6a is a plan view of the semiconductor wafer 206 after the laser processing apparatus 200 has completed a plurality of singulation operations, while FIG. 6b is a cross-section view of the semiconductor wafer 206 as viewed along line C-C' in FIG. 6a. In particular, the plurality of singulation operations include actuating the XY-chuck table 204 in a direction parallel to an indexing axis 212, in order to index the semiconductor wafer 206 relative to the laser-emitting device 202 each time a surface crack 500 is formed on the semiconductor wafer 206.

It can be seen from the plan view of the semiconductor wafer 206 in FIG. 6a that multiple surface cracks 500 are formed on the semiconductor wafer 206, each of which corresponds to a desired line of separation of the semiconductor wafer 206. It can also be seen from the cross-sectional view of the semiconductor wafer 206 in FIG. 6b that each of the surface cracks 500 is formed by the propagation of the corresponding crack 404 along the line of separation as the XY-chuck table 204 moves in the direction parallel to the scribing axis 210.

By focusing the laser beam 208 inside the semiconductor wafer 206 until the crack 404 propagates from the internal damage 402 to the surface of the semiconductor wafer 206 to form the surface crack 500 on the semiconductor wafer 206, little or no debris is formed at the surface of the semiconductor wafer 206 during the singulation operation. Thus, the laser apparatus 200 advantageously addresses the problem of surface contamination of the semiconductor wafer 206 due to the creation of debris by using conventional laser scribing apparatus and processes. In addition, the surface crack 500 formed on the surface of the semiconductor wafer 206 can advantageously serve as a reference marker for dicing the semiconductor wafer 206 into separate pieces. If the surface crack 500 were not formed and the surface of the semiconductor wafer 206 were intact, it would be technically difficult to determine the exact location of the internal damage 402 inside the semiconductor wafer 206 to perform a subsequent dicing process, to divide the semiconductor wafer 206 into separate pieces along the internal damage 402.

Various embodiments of this invention can also be envisaged without departing from the scope of the invention. For example, instead of the XY-chuck table 204 moving relative to the laser-emitting device 202, the laser-emitting device 202 may itself be operable to move relative to the XY-chuck table 204 (without the XY-chuck table 204 moving) in orthogonal directions parallel to the scribing and indexing axes 210, 212 when performing the singulation process. Furthermore, the XY-chuck table 204 may be configured to support other types of workpieces beside the semiconductor wafer 206. The laser processing apparatus 200 may also perform singulation of semiconductor wafers made from sapphire, silicon, gallium and/or their compounds.

The invention claimed is:

1. A laser processing method comprising the steps of:
directing a laser beam to a workpiece; and
effecting relative motion between the laser beam and the workpiece,
wherein the step of directing the laser beam to the workpiece comprises focusing the laser beam within the workpiece until internal damage forms within the workpiece and a crack propagates from the internal damage to at least one surface of the workpiece to form a surface crack on the workpiece, and
the step of effecting the relative motion between the laser beam and the workpiece is such that the surface crack on the workpiece propagates along a line of separation on the workpiece.

2. The laser processing method of claim 1, wherein the laser beam has a pulse energy density of between 0.3 and 0.8 uJ/um, and
the step of focusing the laser beam within the workpiece further comprises focusing the laser beam within the workpiece at a distance of between 10 and 25 um from the at least one surface of the workpiece.

3. The laser processing method of claim 1, wherein the laser beam has a pulse energy density of at least 0.5 uJ/um, and
the step of focusing the laser beam within the workpiece further comprises focusing the laser beam within the workpiece at a distance of between 25 and 40 um from the at least one surface of the workpiece.

* * * * *